United States Patent [19]

Ohmura et al.

[11] 4,183,645
[45] Jan. 15, 1980

[54] DATA PRINTING DEVICE FOR PHOTOGRAPHIC CAMERA

[75] Inventors: Hiroshi Ohmura; Hideto Shirane, both of Tokyo, Japan

[73] Assignee: Fuji Photo Film Co., Ltd., Kanagawa, Japan

[21] Appl. No.: 913,059

[22] Filed: Jun. 6, 1978

[30] Foreign Application Priority Data

Jun. 7, 1977 [JP] Japan .................... 52-66834

[51] Int. Cl.² .............. G03B 17/24; H01H 35/02
[52] U.S. Cl. ...................... 354/106; 200/61.48; 200/61.52; 200/61.83; 354/109
[58] Field of Search .................. 354/105–109; 352/90; 200/61.48, 61.51, 61.52, 61.83

[56] References Cited

U.S. PATENT DOCUMENTS

| | | | |
|---|---|---|---|
| 1,212,447 | 1/1917 | Brown | 354/105 X |
| 1,908,430 | 5/1933 | Lapsley | 200/61.48 |
| 3,288,240 | 11/1966 | Franzel | 200/61.52 X |
| 3,363,525 | 1/1968 | Teeple | 354/109 X |
| 3,599,745 | 8/1971 | Hughes | 200/61.51 |
| 4,040,723 | 8/1977 | Groeneweg | 354/109 X |

FOREIGN PATENT DOCUMENTS 682315  9/1939  Fed. Rep. of Germany ........... 354/107

OTHER PUBLICATIONS

Appel et al., Data Recording Apparatus for Cameras, IBM Technical Disclosure Bulletin, vol. 20, No. 6, Nov. 1977, pp. 2472-2473.

*Primary Examiner*—L. T. Hix
*Assistant Examiner*—Thomas H. Tarcza

[57] ABSTRACT

A photographic camera is provided with a pair of data printing systems. The first data printing system is arranged to print an image of data-representing characters along one of the longer sides of the image frame of the film so that the characters are printed on the printed photo in the same orientation as the subject matter of the photo when the photo is taken with the camera body held in its normal position. The second data printing system is arranged to print an image of the data-representing characters along one of the shorter sides of the image frame so that the characters are also printed on the printed photo in the same orientation as the subject matter of the photo when the photo is taken with the camera body held sideways with the shorter sides of the image frame oriented horizontally. The first and second printing systems are selectively actuated in accordance with the orientation of the camera body, whereby data-representing characters are always printed on the film in the same orientation as the photographed image regardless of the position of the camera body.

6 Claims, 7 Drawing Figures

DATA PRINTING DEVICE FOR PHOTOGRAPHIC CAMERA

BACKGROUND OF THE INVENTION

1. Field of the Invention

This invention relates to a data printing device for a photographic camera for recording data such as the photographing date or the like on the film when the picture is taken.

2. Description of the Prior Art

There has been known a data recording camera in which the photographing date or the like is automatically recorded on the film when the picture is taken. The image frame of a camera is generally rectangular and the longer sides of the image frame generally extend in the horizontal direction in the normal position of the camera. When a vertically elongated object is to be photographed, the camera body is turned sideways so that the longer sides of the image frame are in the vertical direction.

In the conventional data recording camera, only one data projecting optical system is provided. The optical system projects the data-representing characters on the film so that they are oriented in the same direction as the object when the camera body is held in its normal position but projects them so as to be turned sideways with respect to the image of the object when the camera body is turned sideways.

It is generally preferred that the data-representing characters be printed in the same orientation as the image of the object regardless of the position in which the camera body is held when the picture is taken.

SUMMARY OF THE INVENTION

Accordingly, the primary object of the present invention is to provide a data printing device for a photographic camera in which the data-representing characters are always printed in proper orientation regardless of the orientation of the camera.

The data printing device of this invention includes at least two data printing systems which are respectively disposed to project an image of data-representing characters along adjacent sides of the film. The data printing systems are selectively actuated in accordance with the orientation of the camera.

In one embodiment of this invention, a first data printing system is disposed to project an image of the data-representing characters along one of the longer sides of an image frame of the film with the tops of the characters directed toward the opposite longer side and a second data printing system is disposed to project an image of the characters along one of the shorter sides of the image frame with the tops of the characters directed toward the opposite shorter side.

The first and second data printing systems are selectively actuated by means of an automatically operated selecting switch.

When the camera is held in its normal position, the first data printing system is actuated, while the second data printing system is actuated when the camera is held in its sideways position. Thus, the data-representing characters are always printed in the same orientation as the photographed image, either along the longer side of the film when the camera is held in its normal position, or along the shorter side when the camera is held in its sideways position.

When the data-representing characters are intentionally to be printed vertically, i.e. not horizontally, along one of the sides of the image frame of the film, the selecting switch is operated to select the data printing system in the opposite way.

PREFERRED EMBODIMENTS OF THE INVENTION

Figure 1:
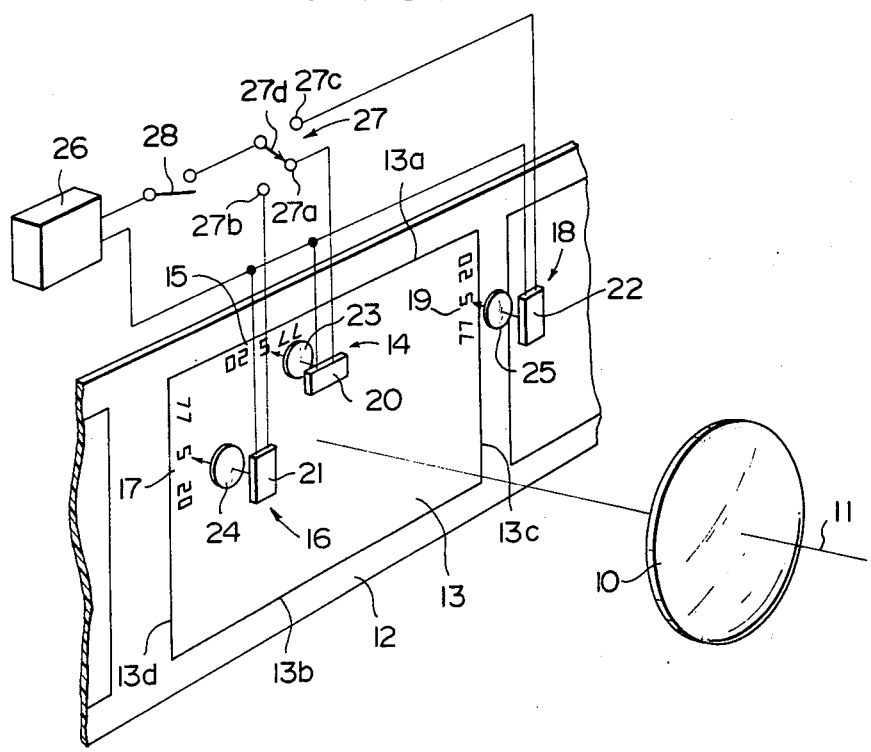
FIG. 1 is a schematic view showing a data printing device for a photographic camera in accordance with an embodiment of this invention.

In FIG. 1, light 11 from an object is projected on a film 12 within a rectangular image frame 13 through a taking lens 10 of a camera (not shown). The image frame 13 has longer sides 13a and 13b and shorter ends 13c and 13d.

A first data printing system 14 is disposed to project an image of the photographing date within the image frame 13 along its upper longer side 13a with the top of each figure directed toward the lower longer side 13b of the image frame 13 as indicated at 15.

A second data printing system 16 is disposed to project an image of the photographing date within the image frame 13 along its left side 13d (in FIG. 1) with the top of the characters directed toward the right side 13c of the image frame 13 as indicated at 17.

In this embodiment of the invention, a third data printing system 18 is also disposed to project an image of the photographing date within the image frame 13 along its right side 13c (in FIG. 1) with the top of the characters directed toward the left side 13d of the image frame 13 as indicated at 19.

The first, second and third data printing systems 14, 16 and 18 comprise digital light emitters 20, 21 and 22, and focusing lenses 23, 24 and 25, respectively.

Each of the digital light emitters 20, 21 and 22 emits imagewise light in the shape of series of digits. The digits of the series can be changed by a means connected to the digital emitters but not shown in FIG. 1. The imagewise light emitted from the emitters 20, 21 and 22 is focused on the film 12 by the focusing lenses 23, 24 and 25 to form images of the digits on the film 12. The digital light emitters 20, 21 and 22 are connected in parallel to a power source 26 by way of a selecting switch 27. Between the selecting switch 27 and the power source 26 is provided a power switch 28 which is closed when the shutter of the camera is released. The selecting switch 27 includes a movable contact 27d and three fixed contacts 27a, 27b and 27c.

The three fixed contacts 27a, 27b and 27c are connected to the digital light emitters 20, 21 and 22, respectively. The movable contact 27d is selectively put into contact with one of the three fixed contacts 27a, 27b and 27c in accordance with the orientation of the camera as will be described in detail hereinafter.

Figure 2:
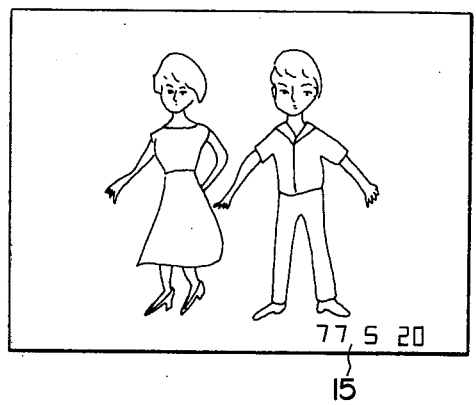
FIGS. 2 to 4 show photos taken by a camera having the data printing device shown in FIG. 1 with the camera body held in its various positions.

When the camera body is held in its normal position, the movable contact 27d is put into contact with the first fixed contact 27a. Therefore, when the shutter is released with the camera body held in its normal position, the first digital light emitter 20 is actuated to project the image of the photographing date 15 on the film 12 along the upper longer side 13a of the image frame 13. Accordingly, upright date-representing characters are printed along the lower edge of the resulting photo as shown at 15 in FIG. 2.

Figure 3:

When the camera body is turned sideways in the clockwise direction (viewed from the front), the movable contact 27d is put into contact with the second fixed contact 27b and when the shutter is released, the second digital light emitter 21 is actuated to print the photographing date 17 on the film 12 along the left side 13d of the image frame 13. As shown in FIG. 3, the resulting photo carries the date 17 in the upright position along the lower edge thereof.

Figure 4:
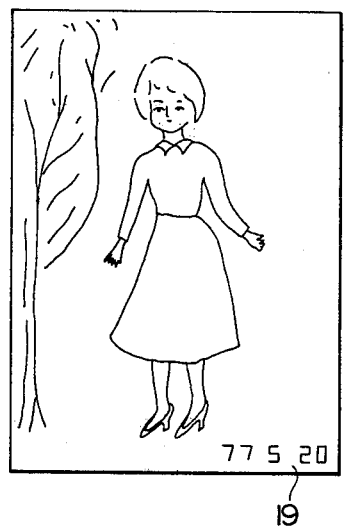

Similarly, when the camera body is turned sideways in the counterclockwise direction, the movable contact 27d is put into contact with the third fixed contact 27c to actuate the third digital light emitter 22. When the third digital light emitter 22 is actuated in response to the shutter release, the date-representing characters 19 are printed along the right side 13c of the image frame 13. In this case, as shown in FIG. 4, the resulting photo carries the date 19 in the upright position along the lower edge thereof.

Figure 5:
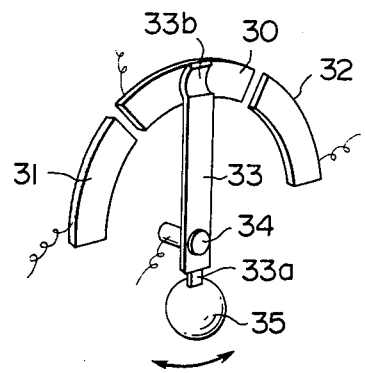
FIGS. 5 to 7 show various selecting switches which can be employed in the data printing device of this invention.

FIG. 5 shows an example of the selecting switch which can be employed in the data printing device in accordance with the above embodiment of this invention. The selecting switch of this example is mounted within a camera body (not shown) and includes first, second and third fixed contacts 30, 31 and 32, and a movable contact 33 which is swingably supported on a fixed pin 34. The three fixed contacts 30, 31 and 32 are arranged along a semicircular line which has its center at the fixed pin 34 and extends in a vertical plane. The fixed contacts 30, 31 and 32 respectively cover angles of approximately 60° but are electrically insulated from each another.

To the lower end 33a of the movable contact 33 extending below the fixed pin 34 is secured a weight 35. Therefore, the movable contact 33 is urged to stay in the vertical direction by gravity. When the camera body is held in its normal position, the upper end 33b of the movable contact 33 is put into contact with the first or middle fixed contact 30. When the camera body is turned sideways, the movable contact 33 is put into contact with the second or third contact 31 or 32 by virtue of the weight 35.

Figure 6:
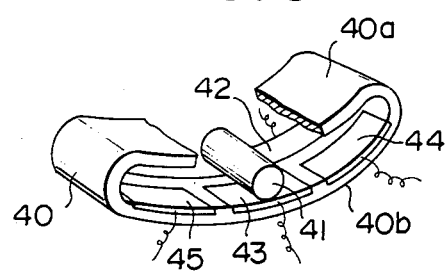

FIG. 6 shows another example of the selecting switch. The selecting switch of this example includes a bow curved housing 40 having upper and lower wall portions 40a and 40b. The upper and lower wall portions 40a and 40b are curved in parallel with each other to define a curved space therebetween. On the inner surface of the lower wall portion 40b is secured an elongated common contact 42 extending substantially over the entire length thereof. On the inner surface of the lower wall portion 40b are further secured three contacts 43, 44 and 45 arranged at intervals in parallel with said common contact 42. The four contacts 42 to 45 are electrically insulated from each another. A rod-shaped conductive member 41 is inserted into the curved space between the upper and lower wall portions 40a and 40b of the housing 40 and is in rolling contact with the inner surface of the lower wall portion 40b. One end portion of the member 41 is always in contact with the elongated common contact 42, and the other end portion thereof is selectively put into contact with one of the three contacts 43, 44 and 45.

When the camera body is held in its normal position, the rod-shaped conductive member 41 rests on the lowermost part of the lower wall portion 40b and is in contact with the first contact 43. When the camera body is turned sideways in the clockwise direction in FIG. 6, the left side of the housing is raised, and accordingly, the rod-shaped conductive member 41 rolls down to the second contact 44 so that it is brought into contact with the second contact 44. Similarly, when the camera body is turned sideways in the counterclockwise direction in FIG. 6, the rod-shaped conductive member 41 rolls down to the third contact 45 so that it is brought into contact with the third contact 45.

In the above described embodiment shown in FIG. 1, the second and third data printing means are provided adjacent to the shorter sides 13c and 13d of the image frame 13 so that the characters can be printed in upright position on the film 12 in whichever direction the camera body is turned. However, since the direction in which the camera body is normally turned is generally determined by the position of the shutter release button on the camera body, either the second or third data printing system 17 or 19 (usually 17) can be eliminated. In such a case, a selecting switch having only two fixed contacts as shown in FIG. 7 can be used.

Figure 7:
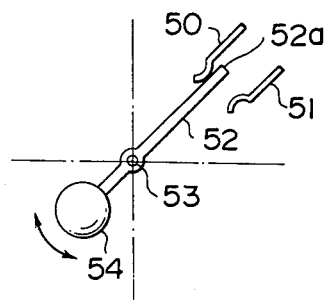

In this example as shown in FIG. 7, a pair of fixed contacts 50 and 51 are provided in the camera body so as to extend in parallel to each other at an angle of approximately 45° with respect to the vertical. A movable contact 52 is swingably supported on a pivot pin 53. The upper end 52a of the movable contact 52 extends between the pair of fixed contacts 50 and 51 to be selectively put into contact therewith. To the lower end of the movable contact 52 is secured a weight 54. When the camera body is held in its normal position, the movable contact 52 is urged to swing in the counterclockwise direction in FIG. 7 by means of the weight 54 so that its upper end 52a is pressed against the first fixed contact 50. When the camera body is turned sideways, i.e. by 90°, in the counterclockwise direction in FIG. 7, the movable contact is swung in the same direction about the pivot pin 53 and its upper end 52a is put into contact with the second contact 51 by virtue of the weight 54.

In the embodiment shown in FIG. 1, the data printing systems 14, 16 and 18 are disposed within the light path of the taking lens 10. Accordingly, the shadows of the printing systems 14, 16 and 18 may possibly be projected within the image frame 13. Therefore, it is preferred that the printing systems 14, 16 and 18 be located outside the light path of the taking lens 10 and the data-representing characters be projected on the film 12 through a half mirror located within the light path.

We claim:
1. A data printing device for a data recording photographic camera in which data such as the photographing date is printed within the image frame of the film when a picture is taken, said device comprising a first data printing system for recording an image of a series of data-representing characters along a first side of the image frame of the film in upright orientation when the camera is held in its normal position, a second data printing system for recording an image of a series of data representing characters along a second side of the image frame of the film adjacent to said first side in upright orientation when the camera body is turned sideways in one direction, and a selecting switch means including a movable contact provided with a weight connected with said first and second printing systems for selectively, by virtue of the weight, actuating said first data printing means when the camera body is held in its normal position and actuating said second data printing means when the camera body is turned sideways in said one direction.

2. A data printing device as defined in claim 1 further inluding a third data printing system for recording an image of a series of data-representing characters along a third side of the image frame of the film opposite to said second side in upright orientation when the camera body is turned sideways in the direction opposite to said one direction, and said selecting switch means being a three-way switch means which selectively actuates one of the first, second and third data printing systems in accordance with the position of the camera body.

3. A data printing device as defined in claim 2 wherein each of said data printing systems comprises a digital light emitter which emits imagewise light in the shape of desired characters and a focusing lens which focuses the light on the film to form the image of the desired characters thereon.

4. A data printing device as defined in claim 2 wherein said selecting switch means comprises three fixed contacts insulated from each other disposed along a semicircular line extending substantially in a vertical plane, said movable contact being swingably supported about the center of the semicircular line and selectively put into contact with one of said contacts, the movable contact being adapted to be swung in accordance with the position of the camera body by virtue of said weight secured to one end thereof so that the other end of the movable contact is selectively put into contact with said three fixed contacts in accordance with the position of the camera.

5. A data printing device as defined in claim 2 wherein said selecting switch means comprises three fixed contacts insulated from each other provided on a curved surface, and said movable contact comprising a rod-shaped conductive member in rolling contact with the curved surface and capable of rolling thereon in the direction in which said three fixed contacts are arranged so that the rod-shaped conductive member rolls on the curved surface when the camera body is turned sideways whereby the conductive member is selectively put into contact with one of the three fixed contacts in accordance with the position of the camera.

6. A data printing device as defined in claim 2 wherein the printing systems are located outside the light path of the taking lens and each is further provided with a half mirror located within the light path of the taking lens for projecting the data-representing characters on the film.

* * * * *